United States Patent [19]
Arnold et al.

[11] Patent Number: 5,361,258
[45] Date of Patent: Nov. 1, 1994

[54] BEACON DETECTION SYSTEM FOR SHARING SPECTRUM BETWEEN WIRELESS COMMUNICATIONS SYSTEMS AND FIXED MICROWAVE SYSTEMS

[75] Inventors: Hamilton W. Arnold, Neptune; Daniel M. Devasirvathan, Lakewood; Nelson R. Sollenberger, Tinton Falls, all of N.J.; Larrie G. Sutliff, Briarcliff Manor, N.Y.; Vijay K. Varma, Holmdel, N.J.

[73] Assignee: Bell Communications Research, Inc., Livingston, N.J.

[21] Appl. No.: 142,533

[22] Filed: Oct. 22, 1993

[51] Int. Cl.⁵ .................... H04Q 7/00; H04B 7/26; H04B 15/00
[52] U.S. Cl. ................... 370/69.1; 370/95.3; 455/62; 455/63; 455/67.1; 379/59
[58] Field of Search .............. 370/95.1, 95.3, 69.1; 455/33.1, 33.3, 33.4, 34.1, 37.1, 56.1, 62, 63, 67.1, 67.3, 67.5; 379/59

[56] References Cited

U.S. PATENT DOCUMENTS

| | | | |
|---|---|---|---|
| 4,849,991 | 7/1989 | Arnold et al. | 375/84 |
| 4,937,841 | 6/1990 | Chuang et al. | 375/94 |
| 4,941,155 | 7/1990 | Chuang et al. | 375/84 |
| 5,084,891 | 1/1992 | Ariyavisitakul et al. | 371/42 |
| 5,148,548 | 9/1992 | Meche et al. | 455/62 |
| 5,155,742 | 10/1992 | Ariyavisitakul et al. | 375/13 |
| 5,177,769 | 1/1993 | Arnold et al. | 375/60 |
| 5,212,831 | 5/1993 | Chuang et al. | 455/54 |
| 5,222,101 | 6/1993 | Ariyavisitakul et al. | 375/13 |
| 5,226,045 | 7/1993 | Chuang | 370/95 |
| 5,258,981 | 11/1993 | Davey et al. | 370/95.1 |
| 5,319,796 | 6/1994 | Grube et al. | 455/56.1 |

OTHER PUBLICATIONS

Cox, *Portable Digital Radio Communications —An Approach to Tetherless Access*, IEEE Communications Magazine, vol. 27, No. 7, Jul. 1989, pp. 30–40.

Cox, *Universal Digital Portable Radio Communications*, Proceedings of the IEEE, vol. 75, No. 4, Apr. 1987, pp. 436–476.

Primary Examiner—Douglas W. Olms
Assistant Examiner—Min Jung
Attorney, Agent, or Firm—Leonard Charles Suchyta; Stephen M. Gurey

[57] ABSTRACT

A system for spectrum sharing between a point-to-point microwave system and a TDM/TDMA wireless communications system in a common geographical area is described. Each transmitter/receiver in the point-to-point microwave system transmits, in addition to its normal information signal, a beacon signal which is uniquely associated with the receiver receive frequency. In selecting uplink and downlink frequencies for port assignment, each port monitors the beacon frequencies and selects as uplink and downlink frequencies, frequencies which associated beacons fall below a predetermined threshold. Similarly, before accessing the wireless communications system through a selected port, a portable monitors the beacons associated with the selected port's uplink frequency. If the beacon associated with the uplink frequency exceeds a threshold, the portable selects an alternate port through which to access the network. Also, during a call an emergency link transfer to another port is made if the monitored beacon corresponding to the portable's uplink frequency rises above the threshold.

16 Claims, 7 Drawing Sheets

BEACON DETECTION SYSTEM FOR SHARING SPECTRUM BETWEEN WIRELESS COMMUNICATIONS SYSTEMS AND FIXED MICROWAVE SYSTEMS

CROSS REFERENCE TO RELATED APPLICATION

This application describes and claims subject matter that is also described in our co-pending United States patent application also assigned to the present assignee hereof and filed simultaneously herewith: "BEACON DETECTION METHOD AND APPARATUS FOR SHARING SPECTRUM BETWEEN WIRELESS COMMUNICATIONS SYSTEMS AND FIXED MICROWAVE SYSTEMS", Ser. No. 08/142,553.

BACKGROUND OF THE INVENTION

This invention relates to a technique for spectrum sharing between private point-to-point microwave systems and wireless communications systems such as a TDM/TDMA system used for low power portable digital telephony.

People by their very nature are highly mobile; no where is this more true than in modern day society with its myriad forms of travel. At the same time, many people increasingly have a need to be able to telephonically communicate with others particularly while they are on "the go", i.e. while they are moving.

However, this need for mobile communications, which existed for quite some time, has remained basically unsatisfied. Since telephones traditionally have cords, any movement of the telephone was traditionally limited by the length of its cord. For many years, only a veritable handful of telephones actually traveled with their users. These mobile telephones included aeronautical, marine and other forms of early radio telephones. Inasmuch as these mobile telephones were priced well beyond the affordability of the average telephone subscriber, none of these radio telephones ever encountered widespread use. Accordingly, for the vast majority of subscribers, a telephone set was installed at each subscriber location and there it remained unless it was reinstalled elsewhere. Thus, these subscribers either remained close to their telephone and thus restricted their mobility particularly in the anticipation of receiving a telephone call, or intentionally sought out a public or private telephone located along their route of travel whenever the need arose to place a telephone call.

Now with increasing sophistication of miniaturized electronic technology and decreasing attendant cost thereof, various vendors provide a number of devices (and/or services) that offer tetherless telephony. These devices, explained in more detail below, attempt to free a subscriber from being bound by the ambulatory constraints imposed by existing wireline telephone sets. In effect, each of these devices now permits subscribers effectively, at least to a certain extent, to take their telephone with them, obtain exchange access, and remain in communication wherever they go. These devices include cordless telephones, cellular mobile radio transceivers, public packet radio data network transceivers and radio pagers. As a growing number of consumers perceived the freedom of movement offered by these devices, a large demand was created for these devices. Moreover and not unexpectedly, as the prices of these devices continue to fall due to manufacturing economies and technical developments, the demand for these devices correspondingly continues to substantially increase. Specifically, more than 25 million cordless telephone sets are in use today throughout the United States with demand for these sets continuing to rise as the price of cordless telephones with increasing sophisticated has remained within a $100.00 to $200.00 range. In addition, more than three million cellular telephone sets are currently in use throughout the United States. As the price of various cellular sets falls from more than a $1000.00 which occurred merely a year ago to only a few hundred dollars today, the demand for these sets has increased precipitously. As a result, the number of installed sets has climbed at such an astonishing rate that in certain urban areas, such as New York, the number of sets in use at peak times is beginning to strain the capacity of the existing cellular network to handle the concomitant call traffic.

While, each of the present tetherless telephonic technologies possesses certain advantages, each technology also unfortunately has certain drawbacks that significantly restrict its use. In this regard, see, e.g., Cox, "Portable Digital Radio Communications—An Approach to Tetherless Access", IEEE Communications Magazine, Vol. 27. No. 7, July 1989 pages 30-40; and Cox, "Universal Digital Portable Radio Communications", Proceedings of the IEEE, Vol. 75, No. 4, April 1987, pages 436-476.

Specifically, as to cordless telephones, such a telephone consists of two transceivers: a base unit and a handset, that collectively form a low power duplex analog radio link. The base unit is connected, typically by a subscriber to a wireline access point in a conventional telephone network in lieu of or as a replacement for a wireline telephone, in order to implement a tetherless substitute for a telephone cord. Once connected, the base unit appears to the telephone network as a conventional telephone. The base unit contains a transmitter and a receiver, and simple control and interface apparatus for dialing, accepting ringing, terminating calls and coupling voice from the telephone line to the transmitter and from the receiver within the base unit to the telephone line. The handset, which is truly portable, contains simple control logic for initiating, receiving and terminating calls with the base unit and for turning its own transmitter on and off. To provide true duplex operation, separate carrier frequencies are used by the transmitters in the base unit and handset. Since cordless telephones operate with very low input power to their transmitter, usually on the order of only several milliwatts, the handset generally utilizes several small rechargeable batteries as its power source. This enables the handset to be made relatively small, lightweight and to be continuously used for a relatively long period, typically several hours, before its batteries require recharging. Furthermore, the very low level of power radiated from the handset poses essentially no biological radiation hazard to its user.

Unfortunately, the primary disadvantage of cordless telephones is their highly limited service area. Because cordless telephones use relatively low transmitter power, these telephones have a maximum range that varies from typically a few hundred to a thousand feet, which in turn results in a very small service area. A secondary disadvantage associated with cordless telephones stems from the limited number of available frequencies. At present, only a few separate frequencies, typically up to 10 duplex channels, have been allocated by the Federal Communications Commission (FCC) for use by cordless telephones. Moreover, early cordless telephones by their very design have been very susceptible to co-channel interference. This interference arises by the simultaneous operation of two or more cordless telephones situated in close proximity to each other, such as in an immediate neighborhood of a residential area. In a very small geographic area with a very low density of users, a reasonable probability exists that within this area one or more duplex pairs will not be in use at any one time, and, as such, this interference will not occur therein. Nevertheless, in an effort to avoid this interference, relatively sophisticated cordless telephones are now capable of operating on any one of a number of preprogrammed duplex pairs with either the user or the telephone itself selecting, manually in the case of the user and automatically by the telephone, the specific pair that is to be used at any one time. Unfortunately, if a sufficient number of cordless telephones are in use in a very densely populated area, such as an apartment building, pair selection may not be sufficient to eliminate the expected incidences of co-channel interference that results from undisciplined and uncoordinated duplex pair assignment and the resulting chaos experienced by users situated therein. In addition, since cordless telephones rely on analog modulation of a duplex pair, conversations occurring over a cordless telephone are highly vulnerable to eavesdropping. Furthermore, a cordless telephone only provides limited protection against unauthorized long distance or message units calls being made there through. While preprogrammed digital or tone access codes are being used between individual handset-base unit pairs and provide sufficient protection against casual attempts at unauthorized access, these codes are not sufficiently sophisticated to successfully deter a determined orderly assault on a cordless telephone by an unauthorized user. Furthermore, while cordless telephones provide limited portable radio access to a wireline access point, from a network standpoint cordless telephones do not eliminate the need for telephone lines, i.e. a customer drop, to be run to each subscriber.

Nonetheless, in spite of these severe service restrictions, cordless telephones are immensely popular for the freedom, though very limited, that they furnish to their users.

In contrast to the very limited range provided by cordless telephones, cellular mobile radio systems accommodate wide ranging vehicular subscribers that move at relatively high speeds. These systems utilize a relatively high power 850 MHz transmitter, typically operating at an input of approximately 0.5 watt to several tens of watts, in a mobile unit with a relatively high efficiency antenna to access a wireline telephone network through a fixed cell-site (base station). The base station also uses a high power transmitter in conjunction with a tall antenna, typically erected on a tower or tall building, to provide a relatively large coverage area. Due to the expense, typically ranging to $300,000 exclusive of land and building costs, and the antenna size associated with each base station, the least number of base stations are often used to cover a given area. Nonetheless, this arrangement generally provides a circular service area centered on a base station with a radius of approximately 5-10 miles therefrom. In use, a cellular radio system that covers a large region often encompassing a city, its suburbs and major access highways typically includes a number of geographically dispersed base stations. The base stations, containing radio receivers and transmitters and interface and control electronics, are connected by trunks to and coordinated and controlled by one or more Mobile Telephone Switching Offices (MTSOs) that, in turn, also provide access to the conventional wireline telephone network. All of the duplex radio channels available to the entire system are sub-divided into sets of channels. The radio equipment in each base station has the capability of using channels from one of the channel sets. These sets are allocated to the base station in a pattern that maximizes the distance between base stations that use the same sets so as to minimize average co-channel interference occurring throughout a service region. One or more channels are designated for initial coordination with the mobile sets during call setup.

Each mobile (or hand-held) cellular transceiver used in the system contains a receiver and a transmitter capable of operating on any duplex radio channel available to the cellular system. Calls can be made to or from any mobile set anywhere within the large region covered by a group of base stations. The control electronics in the mobile transceiver coordinates with a base station on a special call setup channel, identifies itself, and thereafter tunes to a channel designated by the base station for use during a particular call. Each duplex channel uses one frequency for transmission from base-to-mobile and a different frequency for transmission from mobile-to-base. The signal strength of calls in progress is monitored by the base stations that can serve those calls. Specifically, when the signal strength for a given call drops below a predetermined threshold, typically due to movement of the cellular subscriber from one cell to another, the MTSO connected to that base station coordinates additional signal strength measurements from other base stations which surround the station that is currently handling the call. The MTSO then attempts to switch ("handoff") the call to another duplex channel if one of the other base stations is receiving a stronger signal than that being received at the base station that is currently handling the call. This handoff of calls, totally transparent to the cellular subscriber, preserves the quality of the radio circuit as the subscriber moves throughout the service region. Moreover, calls are handed off from one MTSO to another, as the subscriber transits from one service area into another. Inasmuch as frequency usage is coordinated, relatively efficient use is made of the available frequency spectrum while minimizing the likelihood co-channel interference. In each different geographic service area within the United States, there are two competing cellular systems using different frequencies.

Though cellular mobile radio systems provide wide range, these systems suffer various drawbacks. First, cellular systems were originally designed for use in motor vehicles whose electrical systems could readily provide sufficient power. While portable hand-held cellular transceivers do exist, they must operate with sufficient transmitter input power, typically at least 0.5 watt, to reliably reach a base station. This, in turn, requires that a relatively large battery must be used within the portable cellular transceiver. However, due to the limits of present rechargeable battery technology, the mount of time that the portable transceiver can be used before it requires recharging is often quite limited. Furthermore, the cost of these rechargeable batteries and hence of the portable transceiver is rather high. Moreover, high radiated power levels, such as that which emanate from a mobile or portable cellular transceiver, may be sufficient to pose a potential biological radiation hazard to its user. Furthermore, since cellular systems were not designed to compensate for radio attenuation occurring within buildings, these systems are only able to provide little, if any, service within a building. Low power portable cellular transceivers are not operationally compatible with large cell sizes, designed to match the needs of fast moving vehicular users, and thus often provide poor communication in many areas within these cells. In addition, since cellular systems rely on merely frequency modulating a carrier with voice or data, these systems are also susceptible to eavesdropping. Lastly, from a network perspective, cellular systems are quite inefficient. Due to the inclusion of MTSOs with trunks connected to individual base stations, backhaul of cellular traffic over wired trunks often occurs over several miles prior to its entrance into the wireline network, thereby resulting in a wasteful overbuild of network transport facilities.

Public packet radio data networks presently exist to handle infrequent bursts of digital data between a fixed base station and a number of portable data transceivers. The fixed site has a transmitter that uses several tens of watts; while each portable data transceiver uses a transmitter that operates at a level of several watts. As such, reliable coverage is provided over a service area that may extend several miles in radius from a base station. Individual base stations are connected by a fixed distribution facility to a controller that can, in turn, be connected to either a local exchange network, to handle voice-band data, or a packet-data network which itself interconnects various computers. Multiple users contend for transmission time on typically a single radio channel. Data transmissions on the channel are set up in either direction through bursts of coordinating data, handshaking, that occur between a bag station and a portable data transceiver. Appropriate controller and radio link protocols are used to avoid packet collisions. Once a data transfer is complete between that base station and a data transceiver, the channel is immediately available for reuse by others. Although data bursts are transmitted at relatively high power, each burst is transmitted for only a short duration. As such, the average power consumption for a portable data transceiver is far less than that associated with a portable cellular transceiver thereby allowing physically smaller internal batteries to be used with portable data transceivers than those used in portable cellular transceivers. Nevertheless, the high radiated power levels associated with a portable data transceiver again pose a potential biological radiation hazard to its user. In addition, these networks disadvantageously suffer from limited digital transmission capacity which restricts these networks to carrying short data bursts and not voice, and, like cellular systems, experience coverage restraints when used within buildings.

In contrast to the tetherless systems discussed above, radio paging systems provide simple unidirectional transmission from a fixed location to a specifically addressed portable pager, which when received provides an alerting tone and/or a simple text message. Paging systems provide optimized one-way communication over a large region through a high power transmitter, typically a few kilowatts, that uses high antennas at multiple sites to provide reliable coverage throughout the region. Satellite based paging systems are also in operation to provide extended service regions. Since a pager is merely a receiver with a small annunciator, its power requirement is very low. As such, a pager is quite small, light weight, reliable, relatively low cost, and can operate for long intervals before its batteries need to be recharged or replaced.

Due to the advantages in size, cost and operating duration offered by pocket pagers, attempts exist in the art, to impart limited two-way communication into paging systems which are themselves highly optimized for one-way traffic. One such attempt includes incorporation of an "answer back" message through "reverse" transmission links between the individual pagers and the fixed sites. While these attempts have met with great difficulty, these attempts nevertheless indicate that a substantial demand exists for an inexpensive two-way portable truly tetherless telephonic service that overcomes the range limitations associated with cordless telephones and the weight and cost limitations associated with portable cellular systems.

Furthermore, various intelligent network services are now being offered by the local telephone operating companies in an attempt to provide wireline subscribers with a certain degree of call mobility when they are away from their own wireline telephones. These services include call transfer and call forwarding. Both call transfer and call forwarding allow a subscriber to program a local switch, using any pushbutton telephone, to transfer all subsequently occurring incoming calls that would otherwise be routed to this subscriber's telephone to a telephone associated with a different wireline telephone number that the subscriber desires anywhere in the world either for a given period of time, as in call transfer, or until that subscriber appropriately reprograms the switch with a different forwarding number, as in call forwarding. In this manner, the subscriber can, to a certain extent, continually instruct the telephone network to follow his or her movements and thereby route his or her incoming calls to a different number in unison with that subscriber's actual route of travel. Unfortunately, with these services, the subscriber must manually interact with the network and continually enter a new forwarding telephone number(s) coincident with his or her continuing travel such that the network is always cognizant of the current telephone number to which his calls are to be forwarded.

Thus, a substantial overall need exists in the art for a truly portable personal communication technology that is designed for pedestrian use and which utilizes small, lightweight and relatively inexpensive portable transceivers while eliminating, or at least substantially reducing, the performance drawbacks associated with the use of currently existing tetherless telephonic technologies in portable communication applications.

In an attempt to provide this needed technology, the art has turned to low power portable digital telephony. In essence, this technology, similar to cellular radio, uses a fixed base unit (hereinafter referred to as a port) and a number of mobile transceivers (hereinafter referred to as portables) that can simultaneously access that port on a multiplexed basis. However, in contrast to cellular radio, portable digital telephony, or wireless communications, uses low power multiplexed radio links that operate on a time division multiplexed/time division multiple access TDM/TDMA) basis to provide a number of separate fully duplex demand-assigned digital channels between a port and each of its associated portables. Specifically, each port would transmit time division multiplexed (TDM) bit streams on a pre-defined carrier frequency, with, in turn, each portable that accesses that port responding by transmitting a TDMA burst on a common though different predefined carrier frequency from that used by the port. Quadrature phase shift keying (QPSK), with an inter-carrier spacing of 150 to 300 KHz and within a given operating frequency band situated somewhere between approximately 0.5 to 5 GHz would be used by both the port and portables. The power used by the transmitter in the portable would range between 5–10 milliwatts or less on average and provide a range of several hundred to a thousand feet. As such, the resulting low radiated power would pose essentially no biological radiation hazard to any user. In addition, the port antenna would be relatively small and suitable for mounting on a utility or light pole. With this transmission range, a port could simultaneously serve typically 20-30 separate locally situated portables. The same TDM channels would be reused at ports that are spaced sufficiently far apart to reduce co-channel interference to an acceptably low level but yet conserve valuable spectrum. To provide access to the wireline telephone network, each port would be interfaced, typically through a conventional fixed distribution facility, over either a copper or fiber connection to a switching machine at a local central office. The switching machine would be suitably programmed, in a similar manner as is an MTSO, to controllably and automatically handoff calls from one port to another as subscribers move their portables from port to port.

Due to the very limited transmitter power, each portable is anticipated to be very light-weight, physically small and provide a relatively long operating life between battery recharging or replacement. The cost to a subscriber for a portable is expected, through very large scale integrated (VLSI) circuit implementations, to reside in the range of $100.00 to $350.00. In addition, each port would require a relatively small electronic package and carry an overall expected cost of less than $25,000.00—which is far less, by at least an order of magnitude, than that of a current cellular base station. Moreover, the digital data carried on each channel could be readily encrypted to provide a desired degree of security and privacy against eavesdropping. Furthermore, with this technology, a port antenna, due to its small size, could be readily moved within a building to cope with signal attenuation occurring therein. Port spacings would be properly established within the building and frequency reuse would be properly controlled between these ports to provide portable service having an acceptably low level of co-channel interference to a high density of users situated therein.

From a network perspective, low power portable digital telephony is extremely attractive. At present, approximately $50–100 billion is invested by local operating telephone companies in costs associated with copper subscriber loops that run from distribution points to local telephone company demarcation points on individual customer drops. For a local telephone company, the per-subscriber cost of installing and maintaining a subscriber loop is generally greater at the loop end closest to a subscriber than at the far end thereof since the loop end is more dedicated to that subscriber than the far end is. Given the range provided by portable low power telephony, ports can be appropriately positioned throughout an area to provide radio link based exchange access and thereby substitute inexpensive mass produced VLSI circuitry for costly dedicated copper loops that would otherwise emanate from a distribution facility to an individual subscriber. Hence, by installing various ports throughout for example a building, significant labor intensive installation and maintenance tasks associated with rewiring of telephone drops and relocation of telephone equipment would be eliminated with substantial savings being advantageously realized in attendant subscriber costs as people are moved from office to office therein.

Now, with the attractiveness of low power portable digital telephony being readily apparent, its success, in great measure, hinges on achieving satisfactory performance through the use of TDMA. Various aspects of TDMA have been treated in prior art patents and patent applications such as U.S. Pat. No. 4,849,991, entitled "Method and Circuitry for Determining Symbol Timing for Time Division Multiple Access Radio Systems," issued Jul. 18, 1989 to H. W. Arnold and N. R. Sollenberger, two of the co-inventors herein; U.S. Pat. No. 4,937,841, entitled "Method and Circuitry for Carrier Recovery for Time Division Multiple Access Radio Systems," issued Jun. 26, 1990 to J. C. Chuang and N. R. Sollenberger, U.S. Pat. No. 4,941,155, entitled "Method and Circuitry for Symbol Timing and Frequency Offset Estimation in Time Division Multiple Access Radio Systems," issued Jul. 10, 1990 also to J. C. Chuang and N. R. Sollenberger; U.S. Pat. No. 5,084,891, entitled "A Technique for Jointly Performing Bit Synchronization and Error Detection in a TDM/TDMA System," issued Jan. 28, 1992 to S. Ariyavisitakul, L. F. Chang and N. R. Sollenberger; U.S. Pat. No. 5,155,742, entitled "Time Dispersion Equalizer Receiver with a Time-Reversal Structure for TDMA Portable Radio Systems", issued Oct. 13, 1992 to S. Ariyavisitakul and H. W. Arnold; U.S. Pat. No. 5,177,769, entitled Digital Circuits for Generating Signal Sequences for Linear TDMA Systems", issued Jan. 5, 1993 to H. W. Arnold and N. R. Sollenberger; U.S. Pat. No. 5,212,831, entitled "Method and Apparatus for Autonomous Adaptive Frequency Assignment in TDMA Portable Radio Systems", issued May 18, 1993 to J. C. Chuang and N. R. Sollenberger; U.S. Pat. No. 5,222,101 entitled "Phase Equalizer for TDMA Portable Radio Systems", issued Jun. 22, 1993 to S. Ariyavisitakul and H. W. Arnold; and U.S. Pat. No. 5,226,045 entitled "Method and Apparatus for Autonomous Selective Routing During Radio Access in TDMA Portable Radio Systems", issued Jul. 6, 1993 to J. C. Chuang. Co-pending patent application Ser. No. 10,111 filed Jan. 28, 1993 by S. Ariyavisitakul, J. C. Chuang, and N. R. Sollenberger, discloses a method and apparatus for dynamic power control in TDMA portable radio system; and co-pending patent applications Ser. Nos. 100,515 and 100,020 both filed Jul. 30, 1993 by J. C. Chuang and N. R. Sollenberger, each disclose a method and apparatus for synchronizing timing among the ports in a TDMA portable radio system.

Inasmuch as there is a shortage of free frequency spectrum available for the introduction of new communications services, an FCC proposal is that the low power digital telephony wireless communications systems share spectrum within the 2 GHz frequency band currently being used by fixed point-to-point microwave systems. These microwave system are used by utility companies, railroads, police, medical, and public safety organizations for information transmission.

In order for two communications services to share a common frequency spectrum, an arrangement is necessary to prevent interference between the two system. Spectrum sharing techniques can be broadly classified into spectrum avoidance techniques and spectrum overlay techniques. In spectrum avoidance techniques, mutual interference between a fixed point-to-point microwave system and a wireless communications system is avoided by electromagnetically isolating the two services. Two ways of achieving such isolation are predicting potential interference based on propagation characteristics and measurement-based techniques.

In the former, interference from one system to the other is predicted and geographical areas are defined in which use of both the point-to-point system and the wireless communications system are excluded. For example, if a microwave tower is transmitting at frequency $f_1$ and receiving at $f_2$, for a defined area, generally within a circular region surrounding that tower, the wireless communications system will not be permitted to transmit on frequency $f_2$ because it will interfere with the microwave system. The problem, however, with such an avoidance technique is that exclusion areas are not readily defined because actual pass loss is difficult to predict since they depend on a number of parameters. Conservative calculations must therefore be used leading to an inefficient sharing of spectrum.

The second approach is a measurement based technique in which ports and portables monitor the presence of energy from fixed transmitters before selecting frequencies for their own use. Thus, using the example above, the microwave transmitter energy at $f_1$ is monitored, and if it is above a certain threshold, the port and portables avoid transmitting on the frequency that corresponds to the microwave receiver frequency associated with the transmitter frequency $f_1$, that frequency being $f_2$. In order to support a high density of wireless communications users, however, point-to-point transmitter energy must be detected at levels far below the thermal noise floor of the wireless communications system. In order for ports and portables to make such sensitive measurements, the complexity of the wireless communications system would need to be substantially increased. This is exacerbated by the lack of easy methods to carry out measurements of sufficient sensitivity. Independent stations could be deployed to detect energy from point-to-point transmitters in order to avoid adding complexity to the ports and portables. Efficient sharing of spectrum, however, requires that full advantage be taken of the variability of the path loss between the wireless communications system and the point-to-point microwave radios caused by shadowing. This can only be done by monitoring the energy from the point-to-point transmitters at the site of the ports' and portables' operation. Therefore, for the most efficient sharing of spectrum, ports and portables need to monitor power and dynamically avoid point-to-point links.

An object of the present invention is to avoid the problems of the above-described prediction-based and measurement-based spectrum avoidance techniques for spectrum sharing.

SUMMARY OF THE INVENTION

In the present invention, the ports and portables do not monitor the point-to-point microwave system transmitter energy at the transmitter frequency to determine whether they are likely to cause interference with that tower's receiver. Rather, in accordance with the present invention, a marker beacon transmitter is mounted on the microwave antenna to transmit a continuous wave (CW) signal through every point-to-point receiver antenna system. Each beacon protects its corresponding receiver by identifying the frequency of the point-to-point receiver with a one-to-one correspondence between receiver frequencies and beacon frequencies. Thus, if a port or a portable can detect energy above a set threshold at a particular beacon frequency, transmission by the port or portable at the receiver frequency that corresponds to that beacon frequency is avoided. Unlike the aforedescribed measurement-based spectrum avoidance technique in which the ports and portables measure the energy at the transmitter frequency and which require high sensitivity at the ports and portables, the beacon-based system requires much lower sensitivity since the energy of the beacons can be concentrated in a narrow bandwidth unlike the point-to-point transmitter frequencies, which are spread over a much wider bandwidth. The ports and portables can therefore incorporate a narrow-band filter to capture the beacon energy thereby lowering the noise in the band and resulting in a sensitivity improvement. With improved sensitivity the beacons can be detected more readily than the point-to-point transmitter frequencies, and the ports and portables can be made substantially less complex.

DETAILED DESCRIPTION

Figure 1:
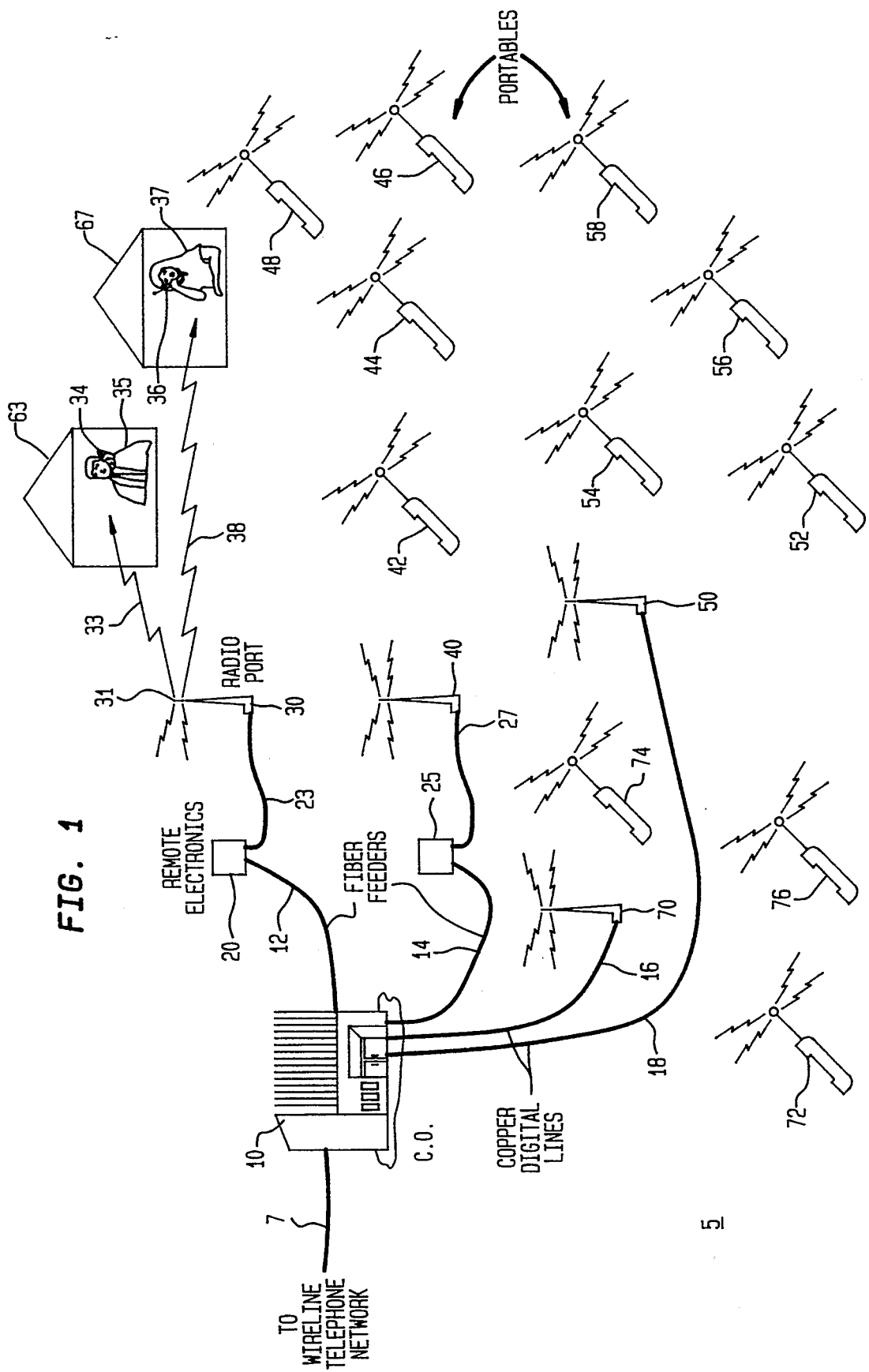
FIG. 1 shows a wireless communications system using radio ports to provide tetherless communications.

An overall diagram of a low power portable wireless communications TDM/TDMA digital telephony system 5 is shown in FIG. 1. Low power digital portable telephony utilizes a fixed base unit (referred to as a "port") and a number of mobile transceivers (each of which is referred to as a "portable"). Through use of time division multiple access (TDMA), each portable can access the port through a separate demand-assigned TDMA channel to carry duplex communication on a time division multiplexed (TDM) basis there between. The power used by the transmitter in each portable would range between 5–10 milliwatts or less on average and provide a range of several hundred to a thousand feet between a port and each of its portables. To accommodate a relatively large service area, several ports are used with individual calls being successively handed off from port to port as their corresponding callers carry their portables from the service area associated with one port to that of an adjacent port. An appropriate switch (not shown) which is located within a local central end office is suitably programmed to operate in a similar manner as does a mobile telephone switching office in order to controllably handoff calls from port to port as the callers transit corresponding local service areas associated therewith.

Specifically, system 5 contains four ports 30, 40, 50 and 70 and respective portables 34 and 36; 42, 44, 46 and 48; 52, 54, 56 and 58; and 72, 74 and 76. The ports themselves are connected to the switch located within central office 10 to provide access to a wireline telephone network. This connection can typically occur in one of two ways: either through copper digital lines 16 and 18 for illustratively ports 70 and 50, respectively, or via intermediary copper digital lines 23 and 27 to remote electronics 20 and 25 for illustratively ports 30 and 40, respectively. The remote electronics contain fixed distribution and concentration facilities for multiplexing traffic, in addition to that provided by ports 30 and 413, onto fiber feeders 12 and 14 which, in turn, feed central office 10. The switch located within the central office is connected, through trunk 7, to the wireline telephone network.

Each port would transmit time division multiplexed (TDM) bit streams on a predefined carrier frequency using quadrature phase shift keying (QPSK) modulation, with an inter-carrier spacing of 150 to 300 KHz and within a given operating frequency band situated somewhere between approximately 0.5 to 5 GHz. With this transmission range, a port could simultaneously serve as many as typically 20 separate locally situated portables that each carries digitized speech at a bit rate of 16 kbits/second. Here, ports 30, 40, 50 and 70 respectively serve portables 34 and 36; 42, 44, 46 and 48; 52, 54, 56 and 58; and 72, 74 and 76. The same TDM channels would be reused at different ports that are spaced sufficiently far apart, such as ports 30 and 70, to reduce co-channel interference to an acceptably low level but yet conserve valuable spectrum. However, adjacent ports would be situated sufficiently close together in order to provide an appropriate degree of overlap of their respective service areas thereby ensuring no loss of coverage occurs during call handoff. Furthermore, each port utilizes a suitable antenna, such as antenna 31 for port 30, to carry its TDM transmissions to its associated portables and receive TDMA bursts therefrom. Given the carrier frequencies being used, each of these antennas is relatively small and suitable for mounting on a utility or light pole or within an office building.

Inasmuch as system 5 replaces local copper drops and telephone cords with short range low power radio links, ambulatory callers are provided with completely tetherless access. Accordingly, through radio links 33 and 38, illustrative callers 35 and 37 located within respective residences 63 and 67 are completely free to move within the entire service area provided by system 5, i.e. that provided by ports 30, 40, 50 and 70, while advantageously maintaining continuity of their existing telephone conversations as well as being able to place calls through other ("non-home") ports as their travel progresses.

Each port continuously transmits on a TDM basis, while portables transmit in bursts on a TDMA basis to their associated port. Two different carrier frequencies are used to carry communication between each port and a portable: one frequency, frequency f1 for port 30, to carry communication from that port to each of its portables (downlink transmission) and another frequency, frequency f2 for port 30, to carry communication from each of these portables to this port (uplink transmission). Although adjacent ports use different pairs of frequencies, one particular uplink frequency being associated with each downlink frequency, these carrier frequencies are also reused for ports that are spaced sufficiently far apart from each other to conserve spectrum. By employing the procedure of the aforenoted U.S. Pat. No. 5,212,831 issued May 18, 1993, which is incorporated herein by reference, the downlink frequencies of all ports (and thus that port's associated uplink frequency) are assigned so as to maintain an acceptable low level of co-channel interference at each port.

As one of the portable users desires to connect to the telephone network, that person's portable must select a channel and initiate an access protocol. Selecting a channel (i.e. a port to communicate with) requires determination of the "best" port having a vacant time slot. A "best" port is one determined by the portable to have the highest signal to impairment (SIR) ratio or other quality measure. Generally, this is likely to be that port which is closest to the portable. Thus in FIG. 1, portable 74 would most likely access port 70. Various topological and meteorological conditions, however, can affect the quality of transmission so that the nearest port may not be the "best" port for a portable to access. Therefore, in FIG. 1, the "best" port for portable 74 may not be the nearest port 70, but may rather be port 40 or port 50. The "best" port may also not be available. Although the system shown in FIG. 1 shows only a limited number of portable units associated with each port, in actual practice, however, many more portables may be communicating through a port in a particularly high traffic area thereby occupying all the vacant time slots on the channel. The "best" port with respect to signal quality may not, therefore, be the "best" available port. The aforenoted U.S. Pat. No. 5,226,045 issued Jul. 6, 1993 discloses a method and apparatus for selecting a "best" available port.

Figure 2:
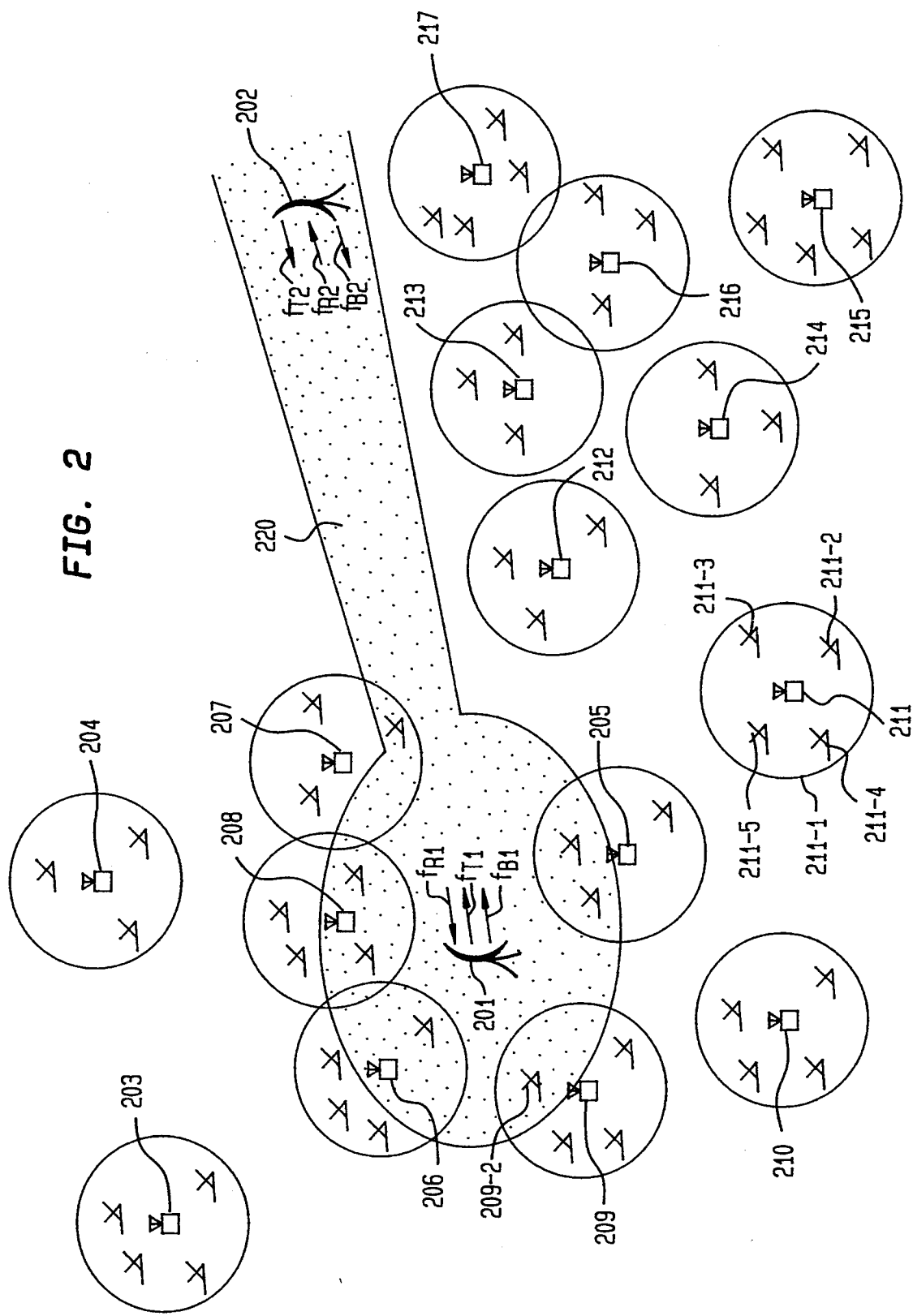
FIG. 2 shows a geographical area in which a wireless communications system and a point-to-point microwave system co-exist and use the same portion of the frequency spectrum for communications.

FIG. 2 illustrates the scenario in which ports and portables share frequency spectrum with a point-to-point microwave system. Antenna 201 is a point-to-point microwave tower which transmits at a frequency $f_{T1}$ to microwave antenna tower 202 and receives from microwave tower 202 at a corresponding frequency $f_{R1}$. The transmitting frequency of tower 202, $f_{T2}$, is thus equal to $f_{R1}$ and the receiving frequency of tower 202, $f_{R2}$, is equal to $f_{T1}$. The low power wireless communications digital telephony system comprises a plurality of fixed ports, shown illustratively as ports 203-217. In an actual system there likely would be additional port locations and more than one pair of point-to-point microwave transmitter/receivers from the same pair of towers or on other towers. The portable units in the system would communicate onto the network through the port providing the "best" signal quality, which in most cases would be the nearest port. Shown surrounding each port is an circular region which defines an area within which portables are likely to select the central port as the "best" port to communicate with. Thus, for example, the portable units 211-2, 211-3, 211-4 and 211-5, within the region defined by 211-1 would likely communicate port 211.

In order to share spectrum with the point-to-point microwave system, shown in FIG. 2 as comprising microwave towers 201 and 202, which receive at at $f_{R1}$ and $f_{R2}$, respectively, a port or a portable cannot transmit at those frequencies if a transmission from a port or portable will interfere with the reception of a microwave transmission at those frequencies. In order to protect each microwave antenna tower from potential interference, each microwave antenna transmits a continuous-wave marker beacon signal to protect its corresponding receiver. Thus, in FIG. 2, tower 201 transmits a beacon signal at a frequency $f_{B1}$ to protect its receiver at frequency $f_{R1}$. Similarly, tower 202 transmits a beacon signal at a frequency $f_{B2}$ to protect its receiver at frequency $f_{R2}$ (equal to $f_{T1}$). In assigning frequencies to the ports during its channel assignment process (see, e.g., aforenoted U.S. Pat. No. 5,212,831), a port, prior to selecting a particular downlink frequency (such as $f_{R1}$), monitors the beacon that corresponds to that downlink frequency ($f_{B1}$) to determine whether the strength of the beacon is above a predetermined threshold level. If it is above the threshold, then a downlink transmission by the port may interfere with the reception of the point-to-point microwave signal at $f_{R1}$ at tower 201 and the port must select a downlink frequency other than $f_{R1}$. Similarly, if a greater than threshold detected beacon corresponds to a port's prospective uplink frequency, then portables transmitting to that port on that uplink frequency may interfere with point-to-point receptions at that frequency and the port must select an alternate downlink/uplink pair. In FIG. 2, ports 205, 206, and 208 are shown being within an exclusion area 220 surrounding tower 201, and are thus each precluded from being assigned frequency $f_{R1}$ for uplink or downlink transmission. It should also be noted that a separate exclusion area surrounds tower 202. This exclusion area, which is not shown in FIG. 2 to avoid confusing the figure, defines a general area in which use of frequency $f_{R2}$ would be precluded by ports or portables. Such a determination at a port or a portable would be based on the detection of beacon $f_{B2}$ above or below a threshold.

In accessing a port for entry onto the wireless communications system, a portable must also monitor the beacon frequency associated with a selected port's uplink frequency. As noted above, during the channel assignment process a port may be assigned an uplink-/downlink frequency pair in which the uplink frequency is the same frequency as used by the point-to-point system if the beacon signal protecting that point-to-point system's receiver frequency is measured by the port to be below a threshold level. A port may be shadowed from a given point-to-point receiver and thus outside that point-to-point receiver's exclusion area. One or more portables communicating on the uplink channel with that port may, however, be in locations that could cause interference to the point-to-point receiver. For example, in FIG. 2, port 209 is outside the exclusion area of tower 201. Portable 209-2, however, falls within the exclusion area and must therefore access a port other than 209 if port 209 has an uplink frequency equal to the receiving frequency of tower 201, $f_{R1}$. In accessing a port, therefore, a portable first selects a port based on a signal quality criteria, which would under most conditions be the nearest port Before setting up the link, however, it monitors the beacon corresponding to the selected port's uplink frequency. If the portable detects the corresponding beacon at a level above a predetermined threshold, then it selects an alternate port to access the network. Similarly, as a portable moves around its service area it must periodically monitor the signal strength of the beacon corresponding to its uplink frequency. If the beacon exceeds the threshold, the portable performs an emergency link transfer to an alternate channel.

Figure 3:
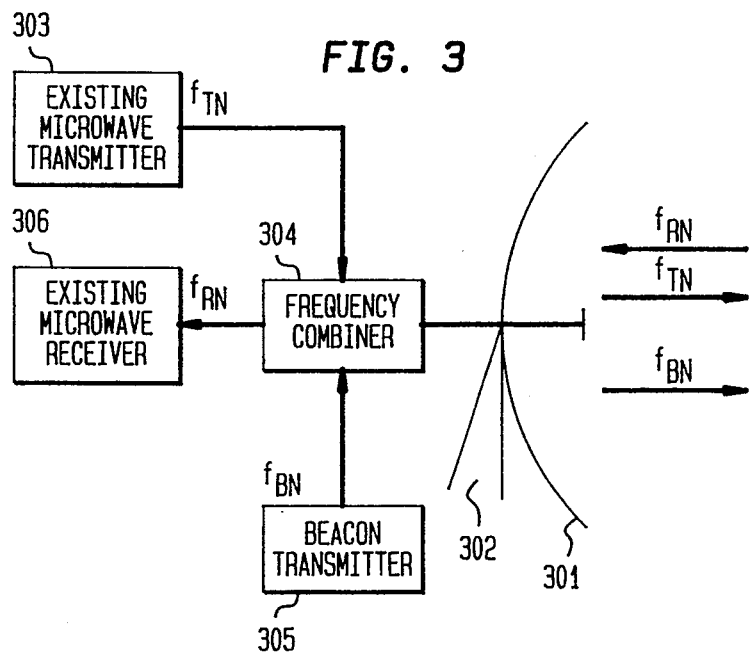
FIG. 3 is a schematic diagram of a point-to-point microwave tower site.

With reference to FIG. 3, a schematic diagram of a point-to-point microwave tower site is shown as modified to accommodate the beacon detection scheme of the present invention. The microwave antenna 301 is physically connected atop a tower 302. A microwave transmitter 303, transmitting signals at a frequency $f_{T1}$, is connected to a frequency combiner 304, which combines the output of transmitter 303 with the output of a beacon transmitter 305. Beacon transmitter 305 produces a beacon signal at a frequency $f_{B1}$. The combined output signals of combiner 304 are transmitted by antenna 301 at frequencies $f_{T1}$ and $f_{B1}$ while the signal transmitted by an antenna at the opposite end of the the point-to-point microwave system is received at a frequency $f_{R1}$. This received signal is passed through frequency combiner 304 to microwave receiver 306.

As previously described, the beacon transmitted by antenna 301 at frequency $f_{B1}$ protects the receiver frequency, $f_{R1}$, of the antenna, which is uniquely identified by that beacon frequency. In other words, a port which detects this beacon signal above a threshold level cannot select frequency $f_{R1}$ as its uplink or downlink frequency since a transmission to or from the port may interfere with the reception of the point-to-point signal received at the antenna at the same frequency. Similarly, as described, a portable cannot access a port whose uplink frequency is $f_{R1}$ if the portable detects this beacon at $f_{B1}$ above a threshold since an uplink transmission by the portable at $f_{R1}$ may likewise interfere with the point-to-point reception by the antenna at the same frequency.

Although FIG. 2 shows a single pair of point-to-point microwave towers 201 and 202 transmitting and receiving there between at frequencies $f_{T1}$ and $f_{R1}$ in the TDM/TDMA low-power digital telephony service area, in an actual telephony service area a plurality of private point-to-point microwave transmitter/receivers will operate in the 1850–1990 MHz band governed by FCC Rule Part 94, which provides for channel bandwidth of 5 or 10 MHz. This band consists of one subband from 1850–1910 MHz for transmission is one direction and a second subband from 1930–1990 MHz for duplex transmission in the opposite direction. Each point-to-point transmission frequency, $f_{TN}$, in one subband, thus has a corresponding receive frequency, $f_{RN}$, in the opposite subband. Each point-to-point receiver antenna system requires its own beacon transmitter mounted to transmit a continuous wave (CW) signal at distinct beacon frequencies. Each beacon, thereby, protects its corresponding receiver by uniquely identifying the frequency of the point-to-point receiver with a one-to-one relationship. As will be described, the beacons are situated at one end of or within one band to protect receiver frequencies in the opposite band. This is done to maximize the separation between beacons and receiver frequencies, thereby minimizing self-interference at a receiver by the beacon signal that protects that receiver's frequency.

The CW beacons are separated by 25 KHz in a Frequency Division Multiplex format transmitting at approximately 1 W. The channelization plan shows 22 center frequencies for two-way transmissions and two frequencies for one-way transmission. Therefore, 22 distinct beacons suffice to create the one-to-one relationship with the two-way point-to-point microwave receiver frequencies. It can be assumed that the 1850–1910 MHz subband is used for uplink portable digital telephony and the 1930–1990 MHz subband is used downlink. Assuming two beacon bands (to protect each half of the duplex pair of the point-to-point allocation), Table 1 shows the one-to-one relationship between beacon frequencies and the point-to-point receiver frequencies. In this table it it assumed that the beacon band protecting the point-to-point receivers in the 1850–1910 channels starts at X MHz and the beacon band protection point-to-point receivers in the 1930–1990 channels starts at Y MHz. Overall, approximately a 500 KHz bandwidth is needed for placing 22 beacon frequencies.

TABLE 1

| Point-to-point receiver frequency in MHz | Beacon Frequency in MHz | Point-to-point receiver frequency in MHz | Beacon frequency in MHz |
| --- | --- | --- | --- |
| 1855 | X | 1935 | Y |
| 1860 | X + 0.025 | 1940 | Y + 0.025 |
| 1865 | X + 0.050 | 1945 | Y + 0.050 |
| 1870 | X + 0.075 | 1950 | Y + 0.075 |
| 1875 | X + 0.100 | 1955 | Y + 0.100 |
| 1880 | X + 0.125 | 1960 | Y + 0.125 |
| 1885 | X + 0.150 | 1965 | Y + 0.150 |
| 1890 | X + 0.175 | 1970 | Y + 0.175 |
| 1895 | X + 0.200 | 1975 | Y + 0.200 |
| 1900 | X + 0.225 | 1980 | Y + 0.225 |
| 1905 | X + 0.250 | 1985 | Y + 0.250 |

There are several alternatives for placing the beacon bands, each having it advantages and disadvantages. Possible beacon band placement combinations are discussed herein below.

Figure 4:
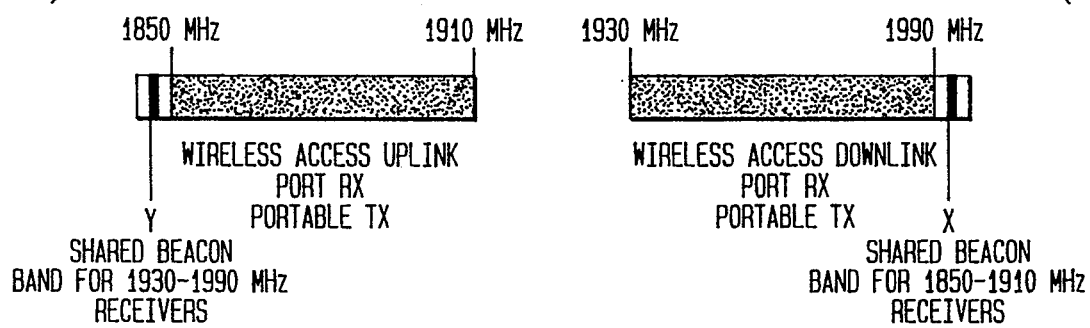
FIGS. 4–8 show various arrangements for placing the beacon frequencies within the common frequency band used for point-to-point microwave and wireless communications.

FIG. 4 shows a beacon band arrangement that places the beacons bands outside the private point-to-point bands. As noted, the beacons in the band just above the 1930–1990 MHz downlink band protect the point-to-point receivers in the 1850–1910 MHz band while the beacons in the band just below the 1850–1910 MHz uplink band protect the point-to-point receivers in the 1930–1990 MHz band. Advantageously, the beacons bands are placed sufficiently away to minimize the adjacent channel interference into receivers which could be operating in the vicinity, and in principle, this arrangement produces the least leakage of beacon energy into the point-to-point receivers. Furthermore, there is no loss of spectrum within the private point-to-point band. Microwave antenna feeds should be capable of handling this slightly higher bandwidth. Also, if the point-to-point band is split into wireless communications system subbands, each of which is allocated to a different provider, the beacons will not interfere with these subbands. Disadvantageously, band allocation as per FIG. 4 requires that the Government band below and the Broadcast band above the point-to-point microwave band lose approximately 1 MHz each, which may not be feasible. The beacons bands are also furthest away from the receivers they protect and hence any effects of frequency selective fading will be felt most in this configuration. Wireless communications system port and portable receivers also have to tune over a slightly wider bandwidth to receive the beacons. In addition, the port receiver filters need to encompass the entire band to check both uplink and downlink for beacon signal energy.

Figure 5:
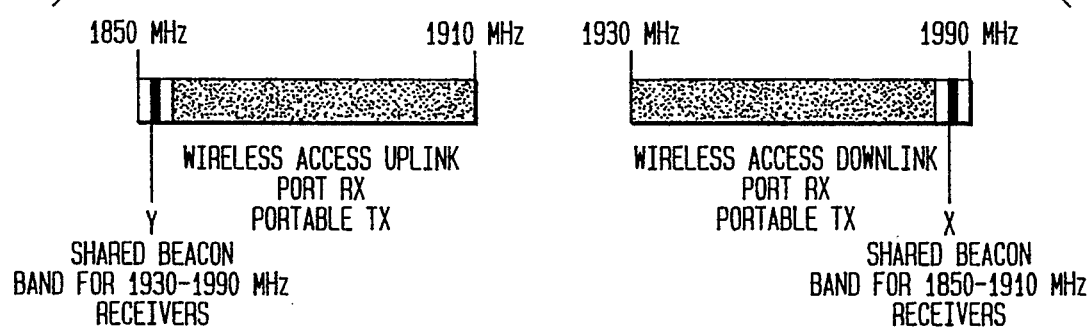

FIG. 5 shows a beacon band arrangement in which the beacons are in the lower and upper band edges of the microwave band. The advantages are as described in connection with the arrangement in FIG. 4, except that no bands outside the point-to-point bands are needed. The disadvantage is that, in practice, a 10 MHz wide slot (i.e., a 10 MHz point-to-point channel) must be cleared for each beacon band. Furthermore, since these are two-way radio channels, their corresponding frequency in the other direction (at 1935 MHz and 1905 MHz) must also be vacated.

Figure 6:
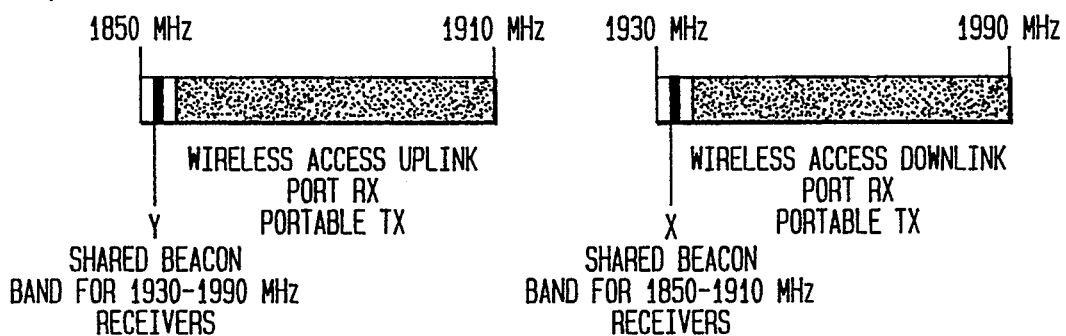

The arrangement in FIG. 6 reduces the microwave channels must be cleared to one two-way pair. However, the beacons near 1930 MHz are closer to the receivers they are protecting (i.e., the lower band) than the beacons near 1850 MHz. This is not necessarily a problem since microwave front end filters are usually designed to reduce the adjacent channel, which is only 10 MHz away.

Figure 7:
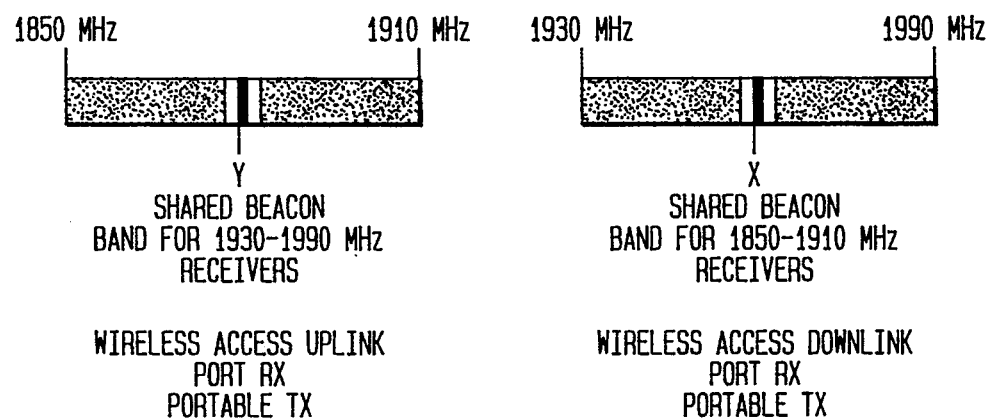

In the arrangement of FIG. 7, the beacons are placed in the middle of the microwave band pairs. One 10 MHz channel pair is cleared for the 1 MHz wide beacon bands. Four 10 MHz bands are still available. The wireless communications system receiver and transmitter filters can be symmetrical in design and the wireless communications system port filters can be less wide, to check both uplink and downlink beacons.

Figure 8:
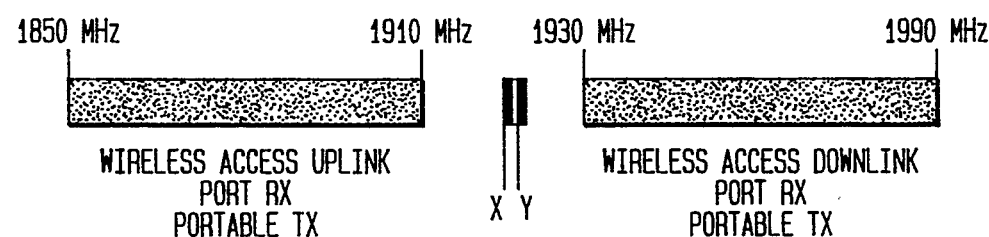

In the arrangement of FIG. 8, the beacons are placed in the center of the whole point-to-point band. It has been proposed, however, that this in-between band be allocated for use as an unlicensed band. Thus, placement of the beacons in this in-between band complicates the design of unlicensed band services. The beacons would, however, be reasonably far apart from the microwave bands they protect. The wireless communications system receiver filter designs are, however, complicated unless they chose to accept the interference from the unlicensed band in the middle into the front-ends, rejecting them elsewhere in their receivers.

Other arrangements could be described for placing the beacon bands for implementing the beacon-protected microwave spectrum sharing scheme for wireless communications systems of the present invention. The choice as to where the beacon bands should be placed must be a balance between wireless communications system receiver filter complexity, adjacent channel interference to microwave systems, the need to clear a microwave band in some of the schemes, and the political ramifications of these.

Each beacon's signal energy is concentrated in a 25 KHz bandwidth and beacon signals are detected by a port or a portable receiver using a filter that has a 25 KHz bandwidth. Therefore, the effective radiated power as far as the receiver is concerned is 30 dBm (if 1 W beacons are assumed). The thermal noise floor at 25 KHz bandwidth is −126 dBm (assuming 4 dB noise figure). If antenna gains are assumed to be 0 dbi and if signals can be detected at the thermal noise floor, beacon energy can be detected up to a path loss of 156 dB. Compared to monitoring point-to-point transmitted energy spread over 10 MHz, which can be detected up to a 130 dB path loss, detection of beacon energy results in about a 26 dB advantage. In terms of the density of users that can be supported outside the exclusion area on this point-to-point frequency, this translates into a factor of 20. Therefore, frequency sharing based on detection of beacons allows supporting a user density over an order of magnitude more than what can be supported otherwise.

Figure 9:
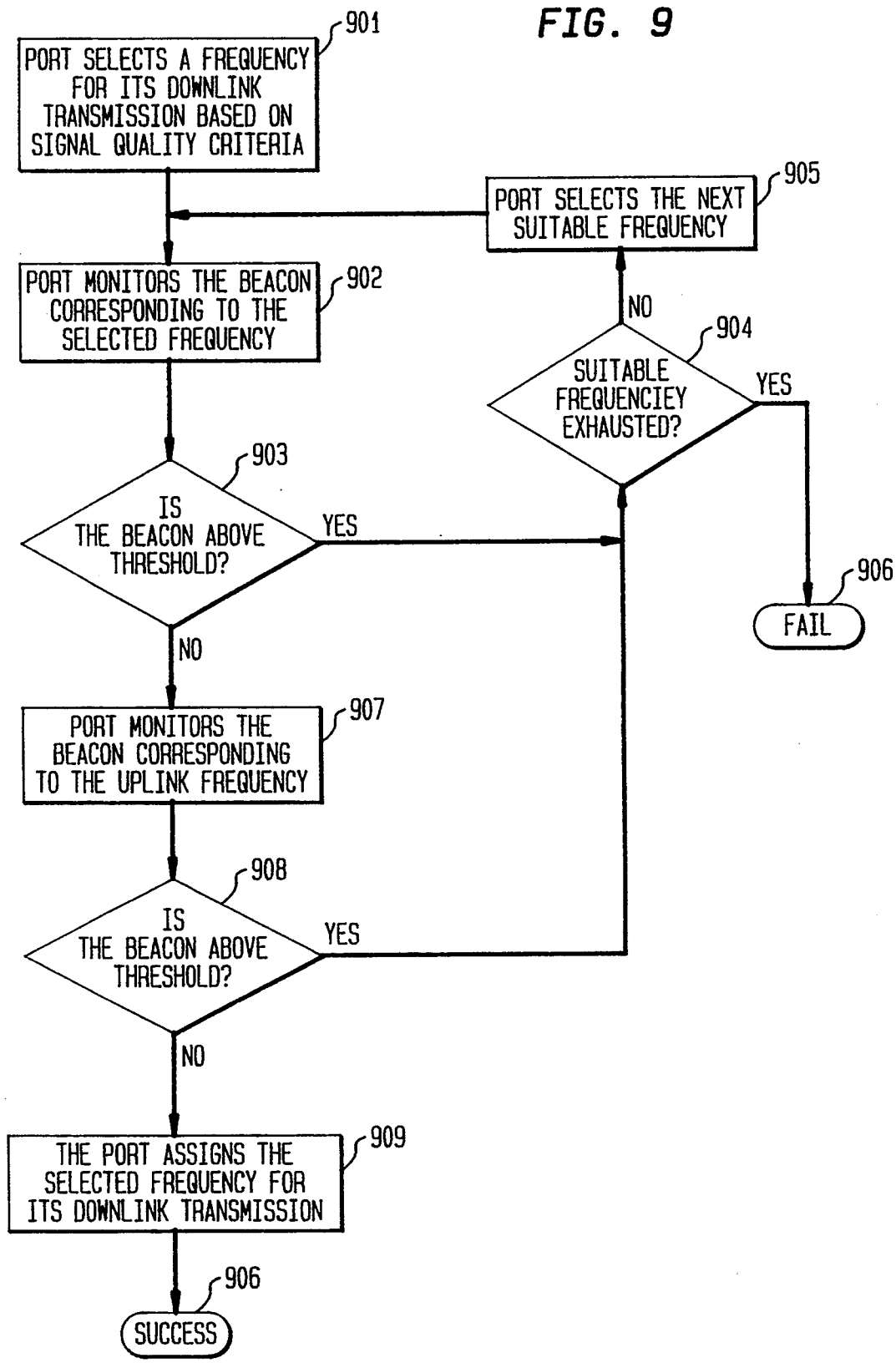
FIG. 9 is a flow chart of the steps performed by a port in the channel assignment process to avoid interference with the point-to-point microwave system.

The steps performed by a port during its channel assignment process are illustrated in flow chart format in FIG. 9. These steps could be incorporated into the method of autonomous adaptive frequency assignment described in the aforenoted U.S. Pat. No. 5,212,831. Specifically, when a port selects a frequency as a potential downlink frequency based on a received power indicator at that frequency (step 204 in noted patent), it then determines whether that frequency is acceptable from a beacon detection standpoint using the present invention. Thus, at step 901 of the present invention, the port selects a frequency for its downlink transmission based on a signal quality criteria. In the noted patent, this is the frequency at which the lowest power is measured. Other alternative criteria, however, could also be used. At step 902 the port monitors the beacon that corresponds to that selected frequency. At decision step 903 the port decides whether the received beacon power is above or below a predetermined threshold. If the beacon power is above this threshold, then a port downlink transmission at the corresponding frequency would be "seen" by the point-to-point microwave receiver operating that frequency and thus cause interference. The port cannot, therefore, select that frequency for downlink transmission. If other suitable frequencies are available (decision step 904) the port selects a next suitable frequency (step 905) and monitors the beacon corresponding to that frequency (step 902). If no other suitable frequencies are available, then the port cannot be assigned a downlink frequency at that time and the process fails (step 906). When the beacon power corresponding to a potential downlink frequency is measured to be below the threshold (decision step 903), the port monitors the beacon corresponding to the uplink frequency associated with that downlink frequency (step 907). If that measured beacon is above a threshold (decision step 908) then uplink signals from the portables to the port would be "seen" by a microwave point-to-point receiver operating at that frequency and could interfere with signals received on the point-to-point system at that frequency. An alternative downlink-uplink frequency pair must then be selected. If that measured beacon corresponding the associated uplink frequency is below the threshold, then the port assigns the selected frequency for its downlink transmission (step 909) and the frequency assignment is complete (step 910). By using this method, therefore, each port is assigned a frequency for downlink transmission that does not interfere with any proximate point-to-point microwave systems receiving on that same frequency. Furthermore, uplink transmissions by portables are also not likely to interfere with a microwave system receiving at the uplink frequency. In order, however, to insure that uplink signals do not cause interference, each portable performs the steps outlined in the flowchart of FIG. 10 before accessing the wireless communications system.

Figure 10:
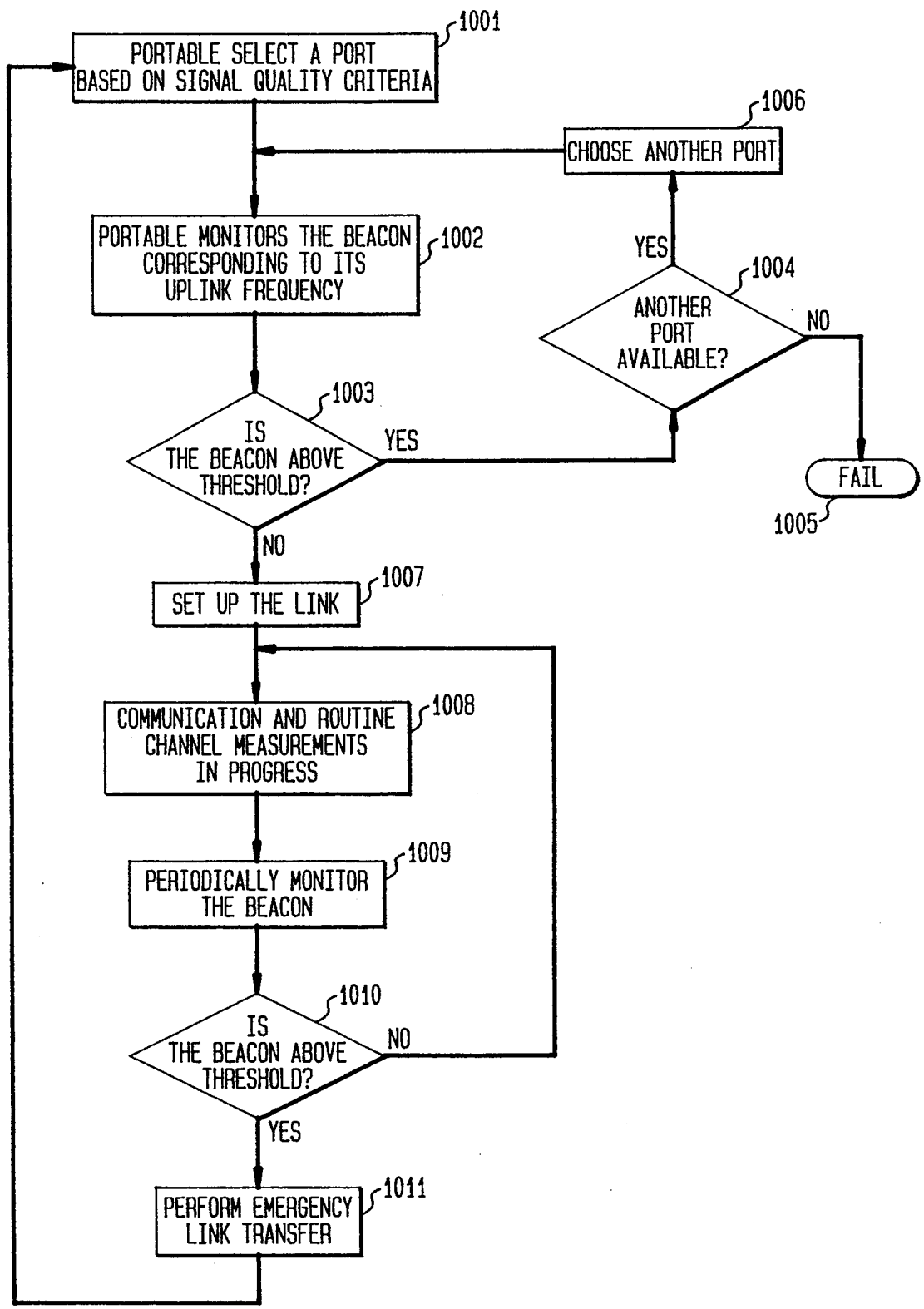
FIG. 10 is a flow chart of the steps performed by a portable in accessing the wireless communications system that avoid interference with the point-to-point microwave system.

With reference to FIG. 10, in step 1001, in order to access the network, a portable selects a port based on a signal quality criteria. In step 1002 the portable monitors the beacon signal that corresponds to that selected port's uplink frequency. If that beacon's detected power is above a threshold level, which is measured in decision step 1003, the portable must select another port to access the system since uplink transmissions by the portable may potentially interfere with the point-to-point receiver being protected by that beacon. In that case, in decision step 1004, the portable searches for another port through which to access the system. If another port is not available, then access to the system is denied and the call fails (step 1005). If a port is available, then the port with the next best signal quality is chosen (step 1006). If the beacon signal power that corresponds to that port's uplink frequency is below the threshold level, the link is step up (step 1007). During the progress of the call, routine channel measurements are made (step 1008) and the beacon signal power corresponding to the uplink frequency is monitored (step 1009). Since the user may roam through the service area of a port during the progress of the call, he may suddenly fall within the exclusion area of a microwave point-to-point receiver that is operating at a receive frequency that is the same as his uplink frequency. The user's uplink transmissions may, therefore, interfere with the point-to-point signals being received by that receiver. Accordingly, if during the call the beacon it detected above a threshold level (decision step 1010), an emergency link transfer to another port is effected (step 1011).

Figure 11:
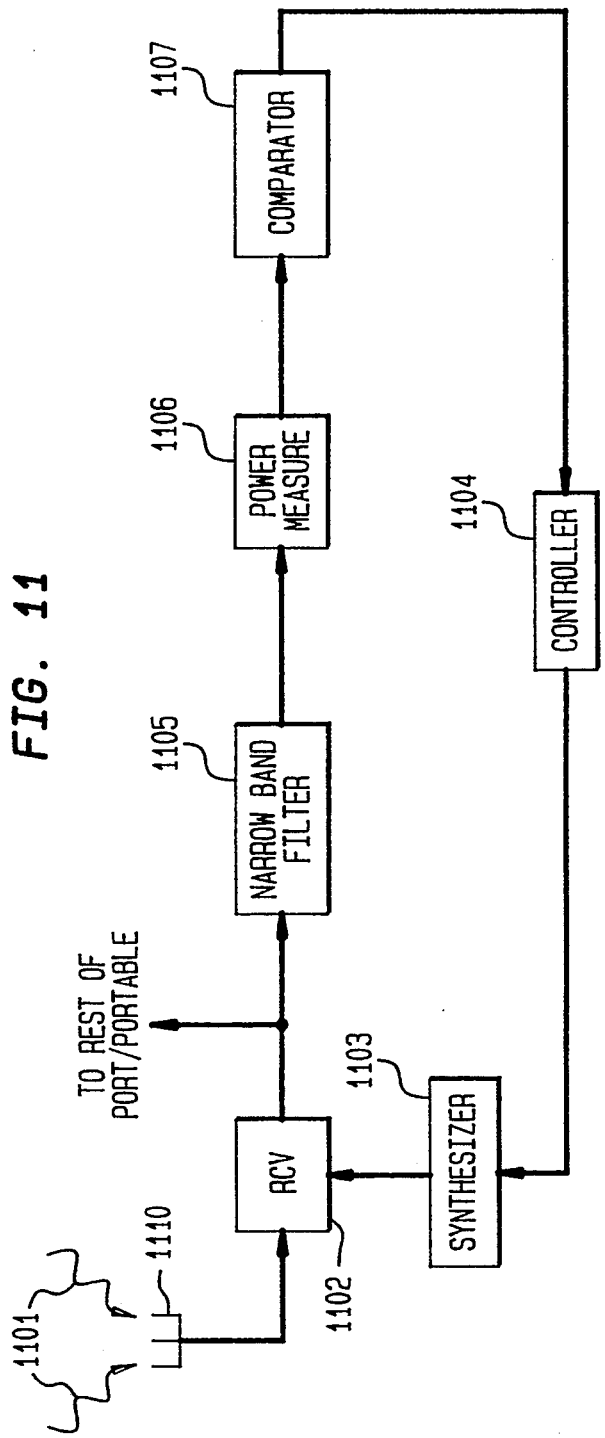
FIG. 11 is a block diagram showing the receiver apparatus in a port or a portable that performs the steps of FIGS. 9 and 10.

FIG. 11 is a block diagram showing the receiver apparatus located in all the ports or portables in the wireless communications network that performs the methods of FIGS. 9 or 10, respectively. For ease of explanation, it will be assumed that FIG. 11 represents such apparatus at the receiver of a port in the system. The radio signals 1101 received by antenna 1110 include the uplink signals from all the ports communicating with the port and the beacon signals transmitted by each microwave transmitter to protect each associated microwave receiver. After a possible uplink-downlink frequency pair is selected for the port using, for example, the method and apparatus described in aforenoted U.S. Pat. No. 5,212,831, the apparatus of FIG. 11 determines whether downlink transmissions by the port to portables or uplink transmissions by portable to the port will cause interference at any receiver in the microwave point-to-point system that is operating at either the selected uplink or downlink frequency. In order to determine whether transmissions at an uplink or downlink frequency will interfere with a receiver in the point-to-point microwave system, the existing port receiver 1102 is tuned by synthesizer 1103, which is controlled by controller 1104, to the beacon frequency that protects the corresponding point-to-point receiver operating at the downlink frequency. The received beacon signal is passed through a narrowband filter circuit 1105. For the numerical examples given herein above, filter circuit 1105 has an approximately 25 KHz bandwidth. The power of the filtered beacon signal is then measured by power circuit 1106 and comparator 1107 compares that power with a predetermined threshold level 1107. If the beacon signal is below the threshold level, then that port's downlink signals will not interfere with a point-to-point receiver receiving at the same frequency and is an acceptable frequency assignment. If that downlink frequency is an acceptable frequency from that interference standpoint, controller 104 tunes synthesizer 103 to the beacon frequency protecting the receiver receiving at the uplink frequency corresponding with that acceptable downlink frequency. Power circuit 1106 then measures the power at that beacon frequency and comparator 1107 compares the measured power with a threshold to determine whether uplink signals at that frequency are likely to interfere with point-to-point receivers operating at the same frequency. When an acceptable downlink/uplink frequency pair is determined, controller 104 sets synthesizer 103 so receiver 102 receives at the assigned uplink frequency and the port transmitter (not shown) transmits at the assigned corresponding downlink frequency.

Although not separately shown, each portable unit contains circuitry similar to the port circuitry shown in FIG. 11 in order to perform the steps of FIG. 10. Specifically, the portable circuitry measures beacon signals both when accessing a port at the initiation of a call and during the progress of a call to insure that the portable's uplink signal does not interfere with any point-to-point receiver operating at the same frequency.

The above-described embodiment is illustrative of the principles of the present invention. Other embodiments could be devised by those skilled in the art without departing from the spirit and scope of the present invention.

What is claimed is:

1. In a geographical area commonly comprising a plurality of point-to-point microwave transmitter/receivers transmitting and receiving information signals at fixed frequencies within a predetermined spectrum to associated transmitter/receivers, and a frequency-reusing radio communications system having a plurality of fixed base units and a plurality of mobile transceivers, each fixed base unit having a transmitter for transmitting at an assigned downlink frequency within said predetermined spectrum to at least one mobile transceiver and a receiver for receiving at an associated uplink frequency within said predetermined spectrum from at least one mobile transceiver and for receiving signals transmitted by other sources within said predetermined spectrum, each mobile transceiver having a transmitter for transmitting signals at any one of a plurality of uplink frequencies to any one of said plurality of fixed base units and a receiver for receiving signals at any one of a plurality of associated downlink frequencies from any one of said plurality of fixed base units and for receiving signals transmitted by other sources within said predetermined spectrum, wherein at least some of the point-to-point microwave transmitter/receivers transmit and receive at at least some of the same frequencies used as downlink and uplink frequencies of the frequency-reusing radio communications system, a spectrum sharing system for preventing a transmission from any fixed base unit or from any mobile transceiver from interfering with the signals received at any point-to-point receiver at a receive frequency that is the same as the downlink or uplink frequency used by a fixed base unit or a mobile transceiver, comprising:

means associated with each point-to-point transmitter/receiver for transmitting a beacon uniquely identified with that point-to-point receiver's receive frequency, the beacon transmitted by the transmitter in that transmitter/receiver being within said predetermined spectrum at a frequency different than the frequency of the information signal transmitted by that transmitter;

base beacon means associated with each fixed base unit for detecting the beacon transmitted by at least one transmitter/receiver and for assigning at that fixed base unit as a downlink frequency or as an associated uplink frequency a frequency other than any point-to-point receiver's receive frequency whose associated detected beacon exceeds a first predetermined threshold; and mobile beacon means associated with each mobile transceiver for detecting the beacon transmitted by at least one transmitter/receiver and for accessing the radio communications system by that mobile transceiver on an uplink frequency other than any point-to-point receiver's receive frequency whose associated detected beacon exceeds a second predetermined threshold.

2. The spectrum sharing system in accordance with claim 1 wherein if during an access period in which one mobile transceiver is communicating with one fixed base unit on a particular uplink/downlink frequency pair, the beacon signal corresponding to that particular uplink frequency as detected by the mobile beacon means in said one mobile transceiver exceeds said second threshold, then said one mobile transceiver transfers access to the radio communications system through a different fixed base unit on a different uplink frequency whose corresponding beacon as detected by the mobile beacon means in said one mobile transceiver is below the second predetermined threshold.

3. The spectrum sharing system in accordance with claim 1 wherein the downlink frequencies transmitted by the fixed base units are in a downlink frequency band and the uplink frequencies transmitted by the mobile transceivers are in a separate uplink frequency band, and the beacons corresponding to the downlink frequencies are in the uplink frequency band and the beacons corresponding with the uplink frequencies are in the downlink frequency band.

4. The spectrum sharing system in accordance with claim 3 wherein the beacons corresponding to the downlink frequencies are at the upper frequency end of the upper frequency band and the beacons corresponding to the uplink frequencies are at the lower frequency end of the lower frequency band.

5. The spectrum sharing system in accordance with claim 3 wherein the beacons corresponding to the downlink frequencies are at the lower frequency end of the upper frequency band and the beacons corresponding to the uplink frequencies are at the lower frequency end of the lower frequency band.

6. The spectrum sharing system in accordance with claim 1 wherein the downlink frequencies transmitted by the fixed base units are in a downlink frequency band and the uplink frequencies transmitted by the mobile transceivers are in a separate uplink frequency band, and the beacons corresponding to the downlink frequencies and to the uplink frequencies are in a frequency region between the downlink and uplink frequency bands.

7. The spectrum sharing system in accordance with claim 1 wherein the downlink frequencies transmitted by the fixed base units are in a downlink frequency band and the uplink frequencies transmitted by the mobile transceivers are in a separate uplink frequency band, and the beacons corresponding to the downlink frequencies are at frequencies above the uplink frequency band and the beacons corresponding to the uplink frequencies are at frequencies below the downlink frequency band.

8. The spectrum sharing system in accordance with claim 1 wherein each beacon is a single frequency continuous-wave signal.

9. In a geographical area commonly comprising a plurality of point-to-point microwave transmitter/- receivers transmitting and receiving information signals at fixed frequencies within a predetermined spectrum to associated transmitter/receivers, and a TDM/TDM wireless communications system having a plurality of fixed ports and a plurality of mobile portable units, each fixed port having a transmitter for transmitting at an assigned downlink frequency within said predetermined spectrum to at least one portable unit and a receiver for receiving at an associated uplink frequency within said predetermined spectrum from at least one portable unit and for receiving signals transmitted by other sources within said predetermined spectrum, each portable unit having a transmitter for transmitting signals at any one of a plurality of uplink frequencies to any one of said plurality of fixed ports and a receiver for receiving signals at any one of a plurality of associated downlink frequencies from any one of said plurality of fixed ports and for receiving signals transmitted by other sources within said predetermined spectrum, wherein at least some of the point-to-point microwave transmitter/receivers transmit and receive at at least some of the same frequencies used as downlink and uplink frequencies of the TDM/TDMA wireless communications system, a spectrum sharing system for preventing a transmission from any fixed ports or from any portable unit from interfering with the signals received at any point-to-point receiver at a receive frequency that is the same as the downlink or uplink frequency used by a fixed port or a portable unit, comprising:

means associated with each point-to-point transmitter/receiver for transmitting a beacon uniquely identified with that point-to-point receiver's receive frequency, the beacon transmitted by the transmitter in that transmitter/receiver being within said predetermined spectrum at a frequency different than the frequency of the information signal transmitted by that transmitter;

port beacon means associated with each fixed port for detecting the beacon transmitted by at least one transmitter/receiver and for assigning at that fixed port as a downlink frequency or as an associated uplink frequency a frequency other than any point-to-point receiver's receive frequency whose associated detected beacon exceeds a first predetermined threshold; and portable beacon means associated with each portable unit for detecting the beacon transmitted by at least one transmitter/receiver and for accessing the TDM/TMDA wireless communications system by that portable unit on an uplink frequency other than any point-to-point receiver's receive frequency whose associated detected beacon exceeds a second predetermined threshold.

10. The spectrum sharing system in accordance with claim 9 wherein if during an access period in which one portable unit is communicating with one fixed port on a particular uplink/downlink frequency pair, the beacon signal corresponding to that particular uplink frequency as detected by the portable beacon means in said one portable unit exceeds said second threshold, then said one portable unit transfers access to the TDM/TDMA wireless communications system through a different fixed port on a different uplink frequency whose corresponding beacon as detected by the portable beacon means in said one portable unit is below the second predetermined threshold.

11. The spectrum sharing system in accordance with claim 9 wherein the downlink frequencies transmitted by the fixed ports are in a downlink frequency band and the uplink frequencies transmitted by the mobile portable units are in a separate uplink frequency band, and the beacons corresponding to the downlink frequencies are in the uplink frequency band and the beacons corresponding with the uplink frequencies are in the downlink frequency band.

12. The spectrum sharing system in accordance with claim 11 wherein the beacons corresponding to the downlink frequencies are at the upper frequency end of the upper frequency band and the beacons corresponding to the uplink frequencies are at the lower frequency end of the lower frequency band.

13. The spectrum sharing system in accordance with claim I 1 wherein the beacons corresponding to the downlink frequencies are at the lower frequency end of the upper frequency band and the beacons corresponding to the uplink frequencies are at the lower frequency end of the lower frequency band.

14. The spectrum sharing system in accordance with claim 9 wherein the downlink frequencies transmitted by the fixed ports are in a downlink frequency band and the uplink frequencies transmitted by the mobile portable units are in a separate uplink frequency band, and the beacons corresponding to the downlink frequencies and to the uplink frequencies are in a frequency region between the downlink and uplink frequency bands.

15. The spectrum sharing system in accordance with claim 9 wherein the downlink frequencies transmitted by the fixed ports are in a downlink frequency band and the uplink frequencies transmitted by the mobile portable units are in a separate uplink frequency band, and the beacons corresponding to the downlink frequencies are at frequencies above the uplink frequency band and the beacons corresponding to the uplink frequencies are at frequencies below the downlink frequency band.

16. The spectrum sharing system in accordance with claim 9 wherein each beacon is a single frequency continuous-wave signal.

* * * * *